United States Patent [19]

Baiocchi

[11] Patent Number: 5,281,469

[45] Date of Patent: Jan. 25, 1994

[54] HIGH IMPACT STRENGTH ANTI-DIMMING MULTIPLE LAYER VISOR

[76] Inventor: Paolo Baiocchi, Via Natta, 10/A, 43100 - Parma, Italy

[21] Appl. No.: 729,056

[22] Filed: Jul. 12, 1991

[30] Foreign Application Priority Data

Jul. 25, 1990 [IT] Italy ................... 21069 A/90

[51] Int. Cl.⁵ ............................................. B32B 27/36
[52] U.S. Cl. ................................... 428/216; 428/412; 428/483; 428/913; 359/234
[58] Field of Search .................. 428/412, 216, 483

[56] References Cited

U.S. PATENT DOCUMENTS 4,478,909 10/1984 Taniguchi et al. ............ 428/447 X
5,051,309 9/1991 Kawaki et al. .................... 428/412

Primary Examiner—P. C. Sluby
Attorney, Agent, or Firm—Bucknam and Archer

[57] ABSTRACT

A visor comprises a transparent sheet made of a polyallyldiglycolcarbonate material or copolymers thereof, thereon there is spread a layer of a clear and resilient adhesive resin, on which there is spread a plastic material film having on its inner surface a thin layer of an anti-dimming film material, adapted to restrain chips which can be produced by an impact on the clear sheet.

1 Claim, 2 Drawing Sheets

HIGH IMPACT STRENGTH ANTI-DIMMING MULTIPLE LAYER VISOR

BACKGROUND OF THE INVENTION

The present invention relates to a high impact strength anti-dimming multiple layer visor.

As is known, allyldiglycolcarbonate, and more specifically it polymerized form with peroxide catalyzers, is broadly used in the optical field.

In fact, this material is a highly clear or transparent polymer which has a good strength to scratches, and is particularly suitable for making lenses and visors of high quality.

However, the products made of the above mentioned material, have a comparatively low strength to impacts and, accordingly, cannot be reliably used in some applications.

In particular, the above mentioned material has not been found suitable for making visors and shields provided for sports and working applications, in which a breakage of an article of manufacture made of the above mentioned material would generate very sharp chips which are very dangerous, if the visor element were provided for protecting the eyes of a user.

Another drawback of the articles of manufacture made of an allyldiglycolcarbonate material is that these articles are easily dimmed under high moisture conditions.

It should be apparent that such a dimming would hinder a proper visibility with consequent further dangers for the user of the mentioned articles.

SUMMARY OF THE INVENTION

Accordingly, the object of the present invention is to overcome the above mentioned drawbacks by providing a visor which is very resistant to impacts and, moreover, has high anti-dimming characteristics.

According to one aspect of the present invention, the above mentioned object, as well as yet other objects, which will become more apparent hereinafter, are achieved by a high impact strength anti-dimming multiple layer visor, characterized in that said visor comprises a clear sheet made of a polyallyldiglycolcarbonate material or copolymers thereof, a clear and resilient adhesive resin layer on said sheet, a plastic material film on said resin layer, and a thin anti-dimming film on an inner surface of said resin layer, said anti-dimming film being adapted to restrain chips of said sheet broken away from said sheet by an impact on said sheet.

BRIEF DESCRIPTION OF THE DRAWINGS

Further characteristics and advantages of the visor according to the present invention will become more apparent from the following detailed disclosure of a preferred, though not limiting, embodiment thereof, which is illustrated in the accompanying drawings, the figures of which schematically illustrate a cross-sectional view of a visor according to the present invention.

BRIEF DESCRIPTION OF THE PREFERRED EMBODIMENT

Figure 1:
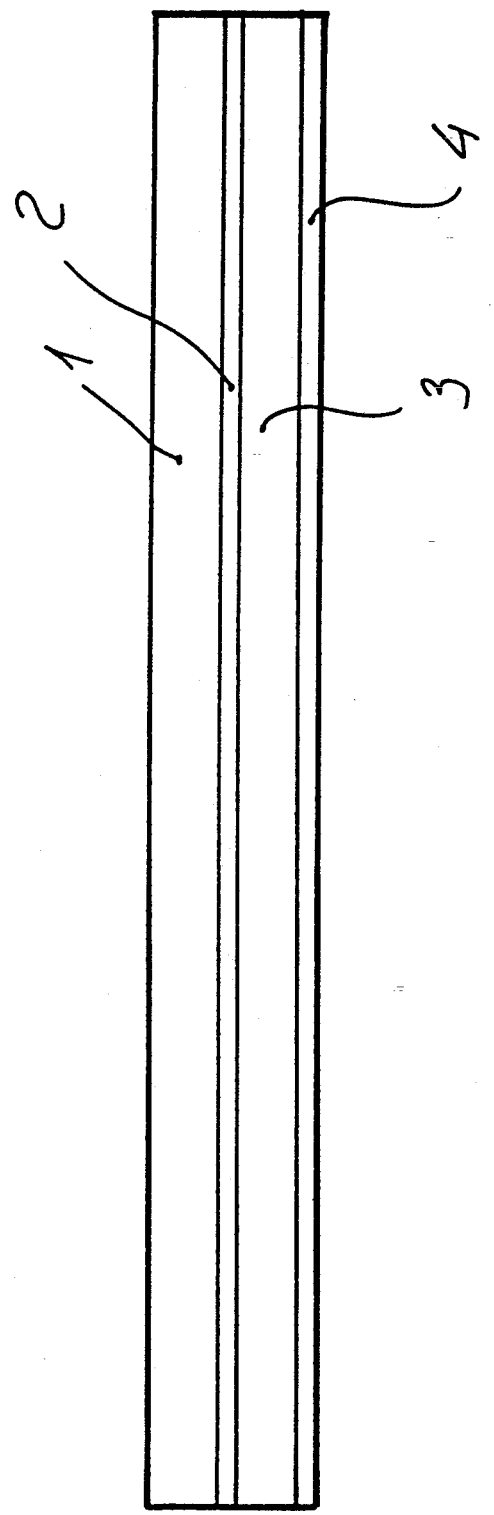

With reference to the FIG. 1, the visor according to the present invention comprises a first layer 1 including a clear or transparent sheet of a polyallyldiglycolcarbonate material (for example the material CR39 of the Company PPG), or copolymers thereof, and has a thickness from 0.3 to 5 mm, said material additionally including substances for absorbing the UV radiations.

On this sheet there is spread a layer 2 made of a transparent resilient adhesive resin, and, on this resin layer there is then applied a clear or transparent plastic material film 3, preferably of a polyester material, having a thickness from 0.05 to 0.2 mm and adapted to operate as a barrier and restraining element for chips broken from the above mentioned sheet 1 as the latter is highly impacted.

The above mentioned layer 2 and film 3, in particular, are so designed as to increase by about 10 times the impact strength of the sheet, as well as to "dampen" and restrain, in a breakage event, the chips of said sheet.

More specifically, on the surface of the polyester film a thin layer 4 of an anti-dimming material can be also advantageously applied, this material, in particular, being designed so as to properly reduce the water surface tension on the surface of the film, so as to prevent small bubbles from being undesirably generated.

This thin layer, in particular, will exclusively allow an invisible water film to be formed, so as to prevent the visor body from being dimmed.

Moreover, according to a modified embodiment of the invention, it is also possible to apply on each opposite face of the polyester film layer 3, and in this order, the above mentioned adhesive layer 2 and sheet 1, so as to provide a laminate including a sheet of allyldiglycolcarbonate on each opposite face of the laminate.

In this connection it should be pointed out that the allyldiglycolcarbonate polymers forming the clear material of the sheet 1 will be selected from highly impact resistant copolymers, in particular, copolymers containing, for example, allylcarbonates of linear and branched poly-hydrated glycols.

Figure 2:
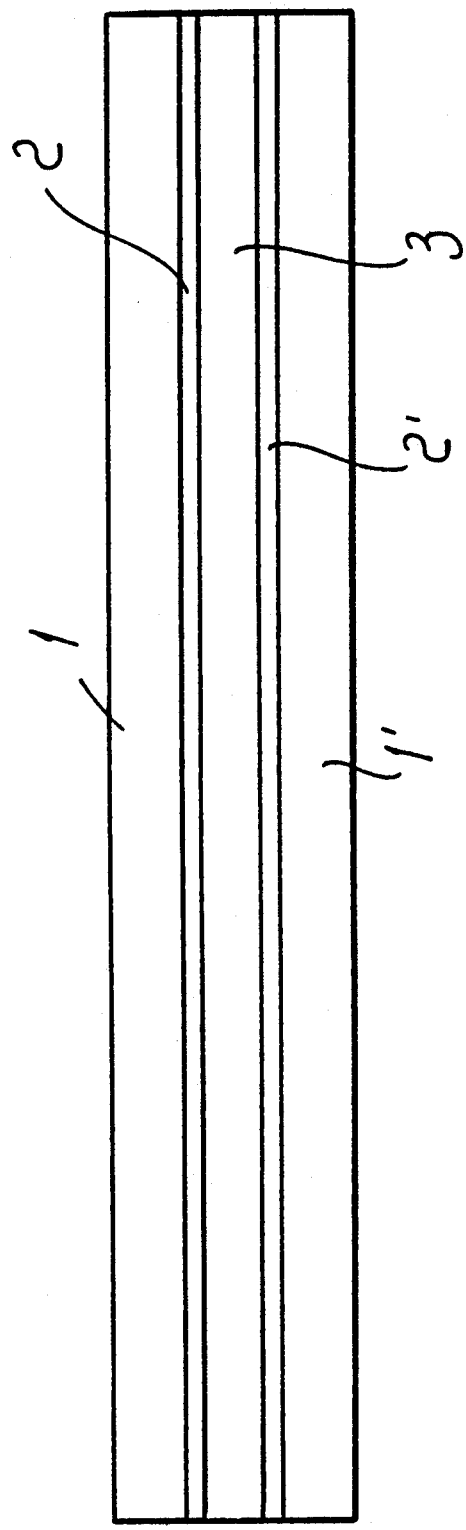

FIG. 2 illustrates a laminate which has on both sides a layer of polyallyldiglycolcarbonate designated by numerals 1 and 1'. Numerals 2 and 2' designate the two layers of the transparent and resilient adhesive resin. The plastic polyester barrier film is designated by numeral 3.

For a better understanding of the present invention, some examples will be hereinafter described of some articles of manufacture made according to the invention, the examples being given only by way of illustration and not of limitation.

EXAMPLE 1

A plate of CR39, having a thickness of 1 mm and a size of 20×50 cm, has been preprocessed in a cleaning alkali solution, rinsed and dried by hot air.

On this plate there has been pressure applied, by silicone rollers, a polyester adhesive and anti-dimming film, for example of the "Vistex" type. This is a material made by Film Specialties, Inc. of Salem Industrial Park, Whitehouse, N.J. and is a polyethylene terephthalate.

The thus made multi-layer plate or laminate has been dried in an anhydrous environment, for 24-48 hours. Then by using a laser cutting method, from this plate there have been formed visor elements having a lot of different shapes, and suitable for use as ski masks, protective spectacles, and so on.

EXAMPLE 2

A plate sample of CR39, having a thickness of 3 mm, has been subjected to an impact strength test according to the modified IZOD method (ASTM D256); the failure value of the sample was 7.58 kJ/m$^2$.

A sample of the plate of Example 1 has been moreover subjected to an impact strength test according to the modified IZOD method (ASTM D256); the measured failure strength of this sample was 80 kJ/m$^2$.

EXAMPLE 3

A ski mask has been made, and included a plasticized PVC supporting frame and a CR39 visor, having a thickness of 1.2 mm. At the environment temperature, the mask mounted on the head of a manikin, is impacted by an impacting body, so as to break the visor; there is observed a projection of chips toward the inner portion of the mask or helmet, at the eye region.

The visor of this mask has been replaced by a visor made of a plate according to Example 1; as this visor was broken, it was found that the chips of the CR39 layer were fixedly restrained at their starting positions without breaking the polyester film.

EXAMPLE 4

The same tests of the preceding Example have been carried out at a temperature of $-20°$ C., and the same results have been obtained.

EXAMPLE 5

Two sheets of CR39 having a thickness of 1 mm have been coupled by using a polyester film coated by an adhesive on two opposite surfaces, for example of the "FLEXcon" type, by using the same procedure as that used in Example 1; from an impact test, the same impact strength values have been measured as those measured in the Example 1.

From the above disclosure it should be apparent that the invention fully achieves the intended object.

While the invention has been disclosed and illustrated with reference to a preferred embodiment thereof, it should be apparent that the disclosed embodiment is susceptible to several modifications and variations, all of which will come within the spirit and scope of the appended claims.

I claim:

1. A high impact strength anti-dimming laminate for visors comprising a first transparent sheet (1) made of a polyallyldiglycolcarbonate material or a copolymer thereof, said transparent sheet (1) having an impact strength of about 7.58 kJ/m$^2$ and a thickness of 0.3-5 mm, a first transparent and resilient adhesive resin layer (2) on said sheet, a plastic barrier polyester film (3) on said resin layer, a second transparent and resilient adhesive layer (2') and a second transparent sheet (1') made of a polyallyldiglycolcarbonate applied on said plastic barrier polyester film, whereby said laminate has on both surfaces thereof said sheet of polyallyldiglycolcarbonate, and wherein said polyallyldiglycolcarbonate includes therein UV absorbing substances, said plastic polyester barrier film has a thickness from 0.05 to 0.2 mm and operates as a barrier against spreading of broken chips from said sheet, said laminate having an impact strength of at least 80 kJ/m$^2$.

* * * * *